(12) United States Patent
Gauthie et al.

(10) Patent No.: US 8,480,031 B2
(45) Date of Patent: Jul. 9, 2013

(54) AIRCRAFT INCLUDING STIFFENER EDGE JUNCTIONS AND METHOD FOR PRODUCING ONE SUCH AIRCRAFT

(75) Inventors: Laurent Gauthie, Tournefeuille (FR); Philippe Bernadet, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 224 days.

(21) Appl. No.: 12/738,612

(22) PCT Filed: Sep. 12, 2008

(86) PCT No.: PCT/FR2008/051630
§ 371 (c)(1), (2), (4) Date: Jun. 30, 2010

(87) PCT Pub. No.: WO2009/050357
PCT Pub. Date: Apr. 23, 2009

(65) Prior Publication Data
US 2010/0258676 A1    Oct. 14, 2010

(30) Foreign Application Priority Data
Oct. 18, 2007 (FR) ...................................... 07 58418

(51) Int. Cl.
*B64C 1/06* (2006.01)

(52) U.S. Cl.
USPC .......................................... 244/120; 244/131

(58) Field of Classification Search
USPC ....................... 244/120, 131, 132, 119, 129.1
See application file for complete search history.

(56) References Cited

U.S. PATENT DOCUMENTS

| | | | | |
|---|---|---|---|---|
| 2,397,450 A | * | 3/1946 | Watter | 52/801.11 |
| 5,518,208 A | | 5/1996 | Roseburg | |
| 2006/0060705 A1 | * | 3/2006 | Stulc et al. | 244/119 |

FOREIGN PATENT DOCUMENTS

| | | |
|---|---|---|
| EP | 1719698 A | 11/2006 |
| WO | 2006001859 A | 1/2006 |

OTHER PUBLICATIONS

International Search Report dated Apr. 24, 2009.

* cited by examiner

*Primary Examiner* — Timothy D Collins
*Assistant Examiner* — Brian M O'Hara
(74) *Attorney, Agent, or Firm* — Dickinson Wright PLLC

(57) ABSTRACT

A system for transmitting stresses at the intersection between a reinforcing frame and a stiffener in a fuselage and to a method for producing one such system. An aircraft fuselage includes stiffeners interrupted by reinforcing frames. At aforementioned interruptions, the stresses experienced by the stiffeners must be transmitted despite the presence of the reinforcing frames. Known solutions are difficult to manufacture and install and do not provide a simple stress transmission path when produced solely from composite materials. In order to solve this problem, the disclosed embodiments include the creation of battens that cover the ends of consecutive sections of a stiffener and the skin of the fuselage, extending under the reinforcing frame in order to join aforementioned two consecutive sections.

11 Claims, 3 Drawing Sheets

AIRCRAFT INCLUDING STIFFENER EDGE JUNCTIONS AND METHOD FOR PRODUCING ONE SUCH AIRCRAFT

CROSS-REFERENCE TO RELATED APPLICATIONS

This application is the National Stage of International Application No. PCT/FR2008/051630 International Filing Date, 12 Sep. 2008, which designated the United States of America, and which International Application was published under PCT Article 21 (s) as WO Publication No. WO2009/050357 A2 and which claims priority from, and the benefit of, French Application No. 200758418 filed on 18 Oct. 2007, the disclosures of which are incorporated herein by reference in their entireties.

BACKGROUND

The aspects of the disclosed embodiments relate to an aircraft comprising stiffener edge junctions and to a method for producing one such aircraft. More specifically, the disclosed embodiments relate to a system for transmitting stresses at the intersection between a reinforcing frame and a stiffener in a fuselage and a method for producing one such system. The purpose of the disclosed embodiments is to route stresses efficiently between two consecutive sections of an aircraft's stiffener. Such a stiffener normally passes through a reinforcing frame in a fuselage of an aircraft. The disclosed embodiments also aim to allow for a simple production and installation of means for routing for stiffeners with an omega-shaped profile.

An aircraft's fuselage comprises several fuselage plated mounted together to form the fuselage. The fuselage plates have several stiffeners. The stiffeners are arranged in the form of raised ribs with respect to the said plates. The stiffeners extend over the plates, in the fuselage, along a longitudinal axis of the fuselage. In addition, such a fuselage includes reinforcing frames, particularly located at the junctions of the fuselage plates. These reinforcing plates are located perpendicularly along the longitudinal axis of the fuselage. In a fuselage, there are therefore many areas where the reinforcing frames and the stiffeners intersect.

At an intersection between a stiffener and a reinforcing frame, the stiffener is interrupted in order to give priority to the reinforcing frame. Such a stiffener is therefore arranged in the form of multiple stiffener sections. Said sections are aligned and separated from each other by the presence of reinforcing frames. However, in order to play its role correctly in the fuselage of a device, the stress that a stiffener endures must be transmitted from one stiffener section to another, despite the presence of interruptions.

It is known in the prior art, in the metal domain, to add brackets to the ends of the stiffener sections to allow continuity in the transmission of stress, despite the presence of reinforcing frames. Such brackets are supported on each side of the reinforcing frame and transmit stress from one stiffener section to the next section through the reinforcing frame, thereby ensuring a continuity of stress along a simple path.

However, such brackets are difficult to manufacture for a stiffener with an omega-shaped transverse profile. By an omega transversal profile, this means a stiffener having two sole plates extending parallel to the fuselage plates and continuously from the nearest ends of the two sole plates, with a stiffener head connecting these two sole plates together. Such a head is arranged in the form of a sail whose profile is trapezoidal or curved. In a transverse cross-section, both sole plates associated with the head give the stiffener a capital omega ($\Omega$) shape.

In addition, the brackets cannot be produced entirely from composite materials. The presence of metallic elements is necessary for the production of the brackets. However, the presence of metallic elements causes corrosion problems, weight problems, and thermal problems in the fuselage.

It is also known from the prior art, in the metal and composite domains, to create double folds in the plate's skin. Such double folds help to increase the rigidity of the plate. The purpose of these folds is to transmit stress from one stiffener section to another, despite the presence of reinforcing frames. The skin covers the inner wall of the fuselage plates. Such folds are formed by creating an additional layer under the skin before the interruption of the stiffener. This additional layers drains stress from a stiffener section before the stiffener is interrupted and transmits it to the stiffener's next section. For this, a fold wing passes under the reinforcing frame and continues under the end of the following stiffener section to transmit stress effectively.

However, the presence of such fold wings under the stiffener implies a variation in the thickness of the skin where the stiffener is attached. It is difficult to produce a stiffener with an omega-shaped transverse profile that adapts to this variation in the thickness of the skin. In addition, the routing of stress from one stiffener section to another is complex, which results in a lower quality transmission of stress compared to the brackets.

SUMMARY

The purpose of the disclosed embodiments is therefore to provide a device that can effectively route stress between two sections of a stiffener, without an excessive loss of stress, and that can be made from composite materials while being simple to manufacture and install.

To achieve a continuity of stress in all of the stiffener sections, despite the presence of reinforcing frames, the disclosed embodiments provide for the addition of parts connecting the ends of consecutive sections of a stiffener. More specifically, the disclosed embodiments provide for the presence of battens covering the skin and the ends of the stiffener sections. Such a batten avoids the creation of folds in the skin and therefore the presence of thickness variations in the skin under the stiffener.

In addition, the disclosed embodiments provide for such a batten to join two consecutive stiffen sections by extending under the reinforcing frame. Such a junction, associated to the stiffener covering, ensures that stress is routed efficiently, without an excessive loss of stress. Moreover, such a batten can easily be created from composite materials, thereby avoiding problems related to the presence of metallic elements.

Finally, such a batten is arranged simply, which facilitates its production and installation in the fuselage.

The disclosed embodiments therefore relate to an aircraft comprising: fuselage plates; a stiffener with an omega-shaped transverse profile, said stiffener extending on a fuselage plate or on a skin along a longitudinal axis of the fuselage; a reinforcing frame located on a plane perpendicular to the longitudinal axis of the fuselage, the stiffener being interrupted at the intersection of the plate with the reinforcing plate, the interruption of the stiffener separating said stiffener into two sections; at least one batten, this batten covering the ends of the stiffener sections, this batten joining two consecutive stiffener sections; characterized in that the batten is located between a plate and the reinforcing frame, said frame being supported against the batten.

BRIEF DESCRIPTION OF THE DRAWINGS

The disclosed embodiments will be better understood upon reading the following description and studying the figures that accompany it. They are presented for illustrative purposes only and are not limiting to the disclosed embodiments. The figures show.

DETAILED DESCRIPTION

Figure 1:
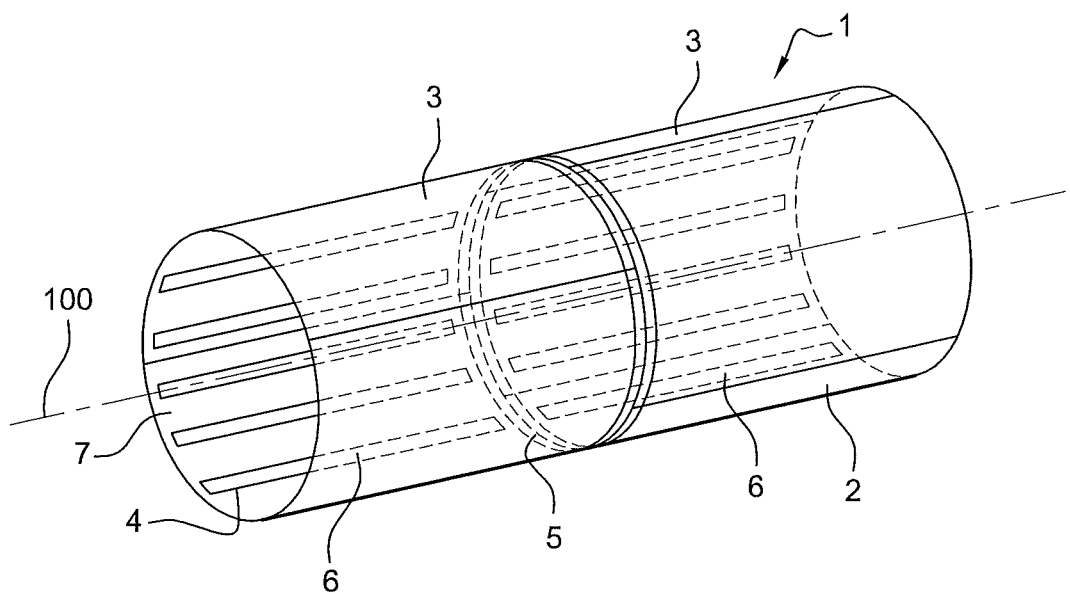
FIG. 1: A schematic perspective view of a part of fuselage.

FIG. 1 shows a schematic perspective view of a part of fuselage. Such a fuselage 1 has several segments 2 mounted together. These segments 2 are generally cylindrical in shape. Such a segment 2 has multiple fuselage plates 3 mounted together in order to form the cylindrical segment 2.

To ensure a certain solidarity to the structure, the fuselage 1 has at least one, or usually several, stiffener 4. These stiffeners 4 extend parallel along a longitudinal axis 100 to the fuselage 1. These stiffeners follow the inner wall of the fuselage 1.

In addition, such a fuselage 1 has at least one, or usually several, reinforcing frame 5. These reinforcing frames are arranged in the form of beams, said beams having a sufficient height to ensure rigidity and prevent the fuselage from undergoing significant deformations.

These reinforcing frames 5 follow the inner wall of the fuselage 1. Such reinforcing frames 5 are located along planes perpendicular to the axis 100 of the fuselage 1. The stiffeners 4 therefore extend along a perpendicular axis to the planes, along which extend reinforcing frames 5.

To give priority to the reinforcing frames 5, the stiffeners 4 are interrupted at each intersection with a reinforcing frame 5. A stiffener 4 is therefore divided into multiple sections 6. A section 6 of a stiffener 4 is therefore either a section 6 at the beginning or end of the stiffener 4, starting at the beginning or the end of the stiffener 4 and stopping just before a reinforcing frame 5, or a stiffener 4 section 6 located between two reinforcing frames 5.

The fuselage 1 can have a skin 7, which covers all or part of the inner wall of the fuselage 1, which is the inner wall of the plates 3. In this case, the stiffeners 4 can be attached to the skin 7 instead of being attached directly to the plates 3.

Figure 2:
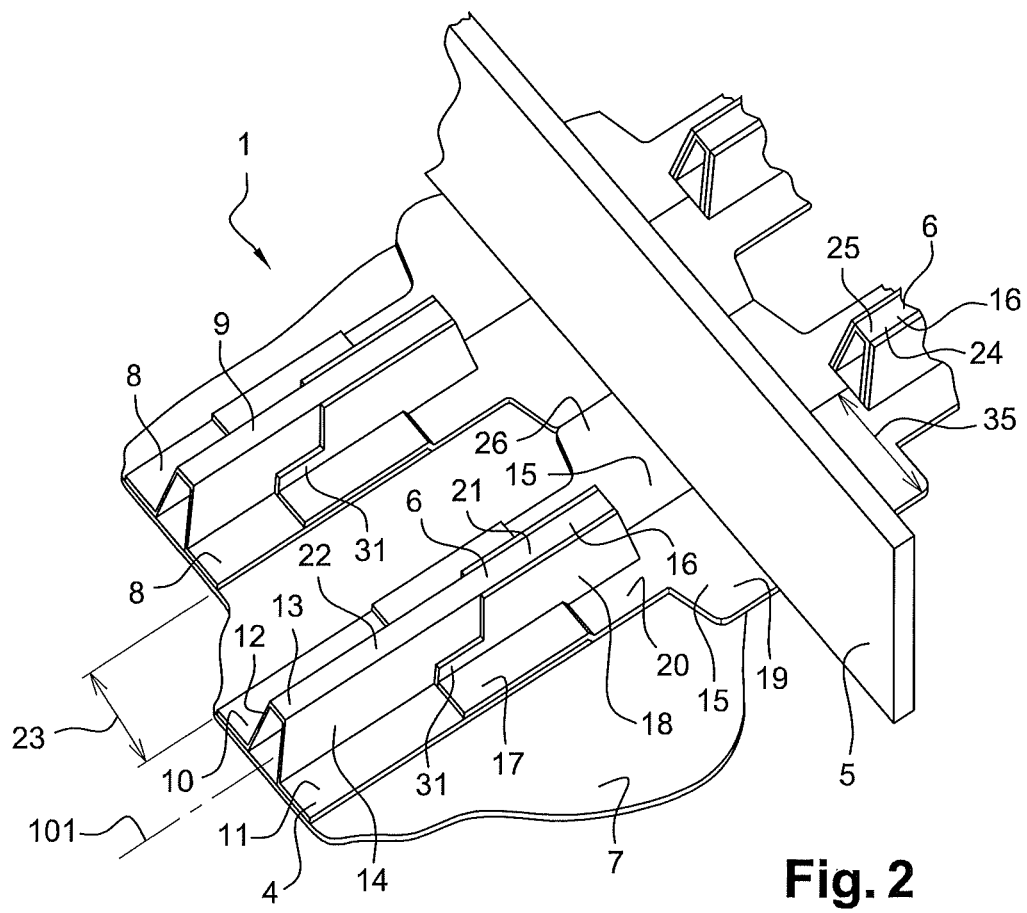
FIG. 2: A schematic perspective view of a part of fuselage according to a first embodiment of the disclosed embodiments.

FIG. 2 shows a schematic perspective view of a part of fuselage 1 according to a first embodiment of the disclosed embodiments. In a transverse cross-section, a stiffener 4 is omega-shaped. More specifically, a stiffener 4 has a head support 8 and a head 9. The head support 8 extends laterally from each site of the head 9 of a stiffener 4. The head support 8 has a first sole plate 10 extending from one side of the head 9 and a second sole plate 11 extending from the opposite side of the first sole plate 10 of the head 9. The first sole plate 10 and the second sole plate 11 extend parallel to the surface of a skin 7 covering the inner wall of the fuselage 1.

The head 9 has two sides and a top. A first side 12 forms an inclined plane relative to the first sole plate 10. This first side 12 connects the first sole plate 10 to the top 13 of the head 9. The top 13 of the head 9 forms a surface parallel to the skin 7 located between the first sole plate 10 and the second sole plate 11. According to the variant of the disclosed embodiments shown in FIG. 2, the width of the top 13 is less than the distance separating the two sole plates 10 and 11. According to other variants of the disclosed embodiments, this width can be greater than or equal to this distance.

The second side 14 forms an inclined plane relative to the second sole plate 11. This second side 14 connects the second sole plate 11 to the top 13 of the head 9. The first sole plate 10, the first side 12, the top 13 of the head 9, the second side 14, and the second sole plate 11 give the stiffener 4 an omega-shaped transverse profile. However, this shape can also be achieved if the head 9 only has one curved plate connecting the first sole plate 10 and the second sole plate 11.

According to the disclosed embodiments, the fuselage 1 has battens 15. There is a batten 15 located at each intersection between a reinforcing frame 5 and a stiffener 4. Such a batten 15 is located between the skin 7 and the reinforcing frame 5. More specifically, such a batten covers the skin 7 at the intersection between a reinforcing frame 5 and a stiffener 4. This batten 15 forms the junction between two consecutive sections 6 of a stiffener 4, the reinforcing frame 5 being supported on this batten 15.

The batten 15 covers the ends 16 of two consecutive sections 6 of a stiffener 4. More specifically, this batten 15 has a blade 17 extending by covering a sole plate 10 and a wall 18 extending by covering a side 12 of the stiffener head.

Such a batten 15 keeps folds from forming in the skin 7. This absence of folds facilitates the installation of the stiffeners 4 at the intersections between the stiffeners 4 and the reinforcing frames 5. In addition, this batten 15 provides for an efficient routing of stress between two consecutive sections 6.

Moreover, such battens 15 can be made entirely from composite materials, without the presence of metal parts. Such battens 15 prevent thermal problems and corrosion related to the presence of metal parts.

According to the disclosed embodiments, after the interruption of the stiffener 4, the battens 15 extend laterally so as to form together a flat and continuous surface 19 that supports the reinforcing frame 5 over its entire surface. The battens 15 have no thickness variations under the reinforcing frame 5. This lack of thickness variation provides for a simple installation of the reinforcing frame 5 in the fuselage 1 while ensuring its stable support.

The disclosed embodiments have multiple possible embodiments for the battens 15.

A first embodiment provides for a blade 17 from a first batten 20 to cover a first sole plate 10 on the first end 21 of a first section 22 of a stiffener 4. A wall 18 from the first batten 20 also covers a first side 12 of the head 9 from this first end 21.

At the interruption in the first section 22 of the stiffener 4, the first batten 20 extends laterally, or perpendicularly at the axis 100 of the fuselage to cover the skin 7 on a width 35 extending between a longitudinal axis 101 of the stiffener 4 to the middle of a strip, with width 23, separating two side by side stiffeners 4. In addition, parallel to the axis 100 of the fuselage 1, the first batten 20 extends under the reinforcing frame 5 to reach a second section 24 of the stiffener 4 that is consecutive to the first section 22. This first batten 22 forms the junction between the first end 21 and a second end 25, respectively, of the first section 22 and the second section 24.

At the start of the second section 24 of the stiffener 4, the width of the first batten 20 is reduced. The first batten 20 therefore covers the end 25 of this second section 24 in the same way that it covers the end 21 of the first section 22, meaning that a blade 17 from the first batten 20 covers a first sole plate 10 and a wall 18 from the first batten 20 covers a first side 12 of the end 25.

In this embodiment of the disclosed embodiments, the first batten 20 and a second batten 26 are located on either side of a single stiffener 4. The second sole plate 11 and the second side 14 of the head 9 are respectively covered by a blade and a wall 18 from the second batten 26. This second batten 26 extends symmetrically to the first batten 20 relative to a plane of symmetry from the stiffener 4.

Figure 3:
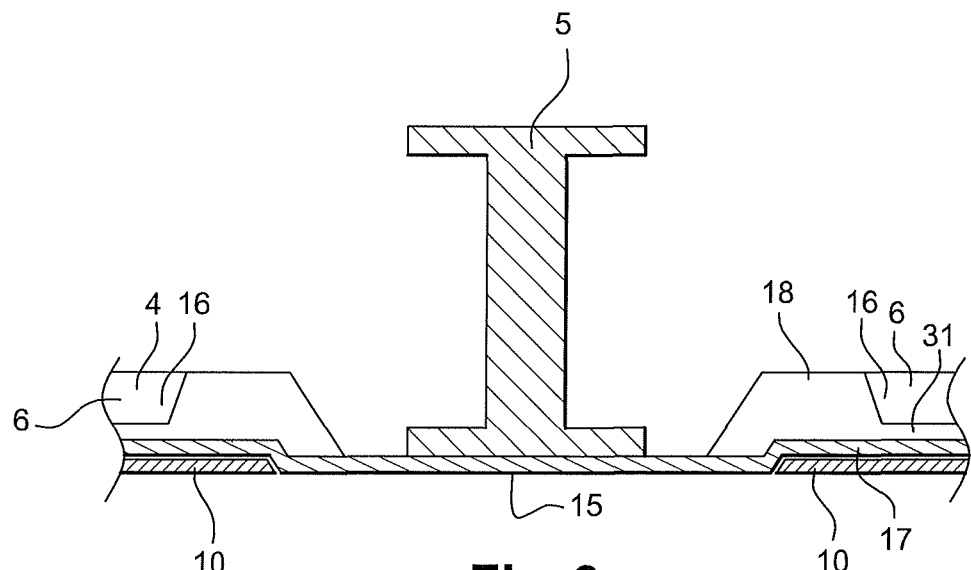
FIG. 3: A cross-sectional view of an intersection between a reinforcing frame and a stiffener according to the disclosed embodiments.

FIG. 3 shows a cross-sectional view of an intersection between a reinforcing frame and a stiffener according to the disclosed embodiments. At a reinforcing frame 5, the stiffener 4 is interrupted; it is therefore divided into sections (22, 24). The ends 21 and 25 of said sections are equipped with battens 15. All of the battens 15 then cover the entirety of the skin 7, or the fuselage plates 3, between two sections 22 and 24 of the stiffeners 4, on the entire support surface of the reinforcing frame 5.

Figure 4:
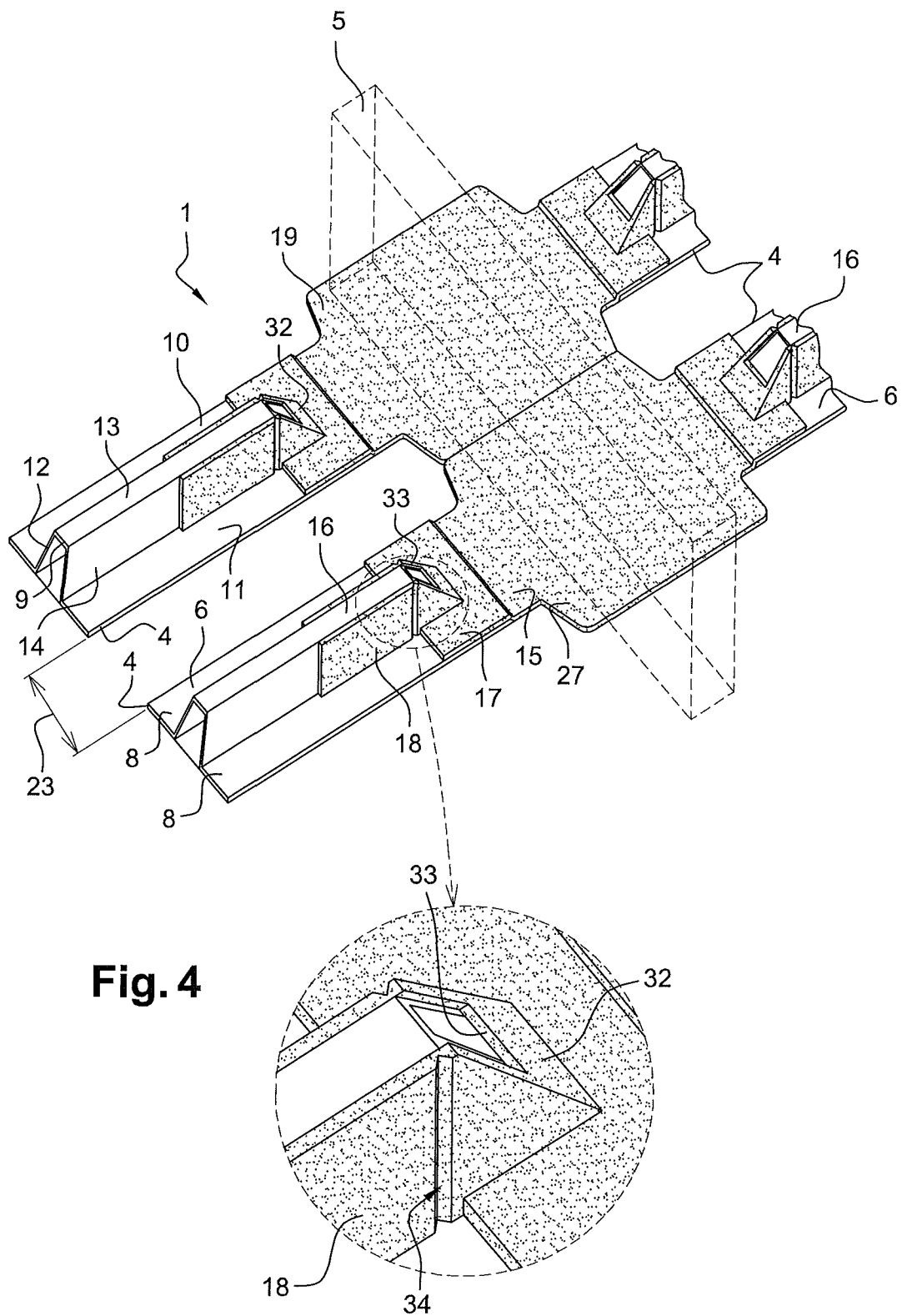
FIG. 4: A schematic perspective view of a part of fuselage according to a second embodiment of the disclosed embodiments.

FIG. 4 shows a schematic perspective view of a part of fuselage according to a second embodiment of the disclosed embodiments. This second embodiment brings together, in a single batten 27, the two battens 20 and 26 shown in FIG. 2. This batten 27 covers the ends 21 and 25 of the stiffener 4 in the same way as the battens 20 and 26 together. In addition, this batten 27 covers the same surface of skin 7, or plate 3, as the battens 20 and 26 together.

Figure 5:
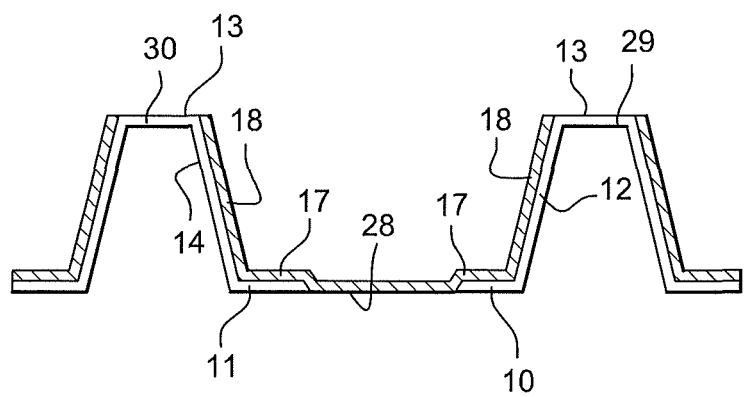
FIG. 5: A cross-sectional view of a stiffener and a batten according to a third embodiment of the disclosed embodiments.

FIG. 5 shows a cross-sectional view of a stiffener and a batten according to a third embodiment of the disclosed embodiments. According to this embodiment, a batten 28 covers a first sole plate 10 and a first side 12 of a first stiffener 29. This same batten 28 also covers a second sole plate 11 and a second side 14 of a second stiffener 30. The first stiffener 29 and the second stiffener 30 are arranged parallel to each other and side by side in the fuselage 1. Such a batten 28 covers the same surface of skin 7 as a batten 20 of a first stiffener 29 associated to a second batten 26 of a second stiffener 30, according to the first embodiment of the disclosed embodiments, described above.

Such battens 15 may be located at the ends 16 of the stiffener 4, uninterrupted by the presence of a reinforcing frame 5, or at the start or at the end of a stiffener 4. These battens equip the ends of a stiffener 4. These battens at the beginning and end of a stiffener cover an end 16 of a section 6 of a stiffener 4 corresponding to the beginning or end of a stiffener 4 and stop on the skin 7, or the fuselage plate 3, without forming a junction with another end 16 of another section 6. These beginning and end battens are used to drain stress in the stiffener 4 at the beginning of a stiffener 4 or to distribute stress from the stiffener 4.

The disclosed embodiments also provide for two variants of routing stress.

In a first variant, FIG. 2, the sole plates 10 and 11 of a stiffener 4 are interrupted farther from the reinforcing frame 5 than the stiffener head 9. This interruption in the sole plates 10 and 11 farther from the reinforcing frame 5 than the end of the head 9 of the stiffener 4 allows stress to be discharged from the stiffener 4 in the batten 15, said discharge being carried out first by the sole plates 10 and 11, then by the sides 12 and 14 of the head 9 of the stiffener 4, and finally by the top 13 of the head 9 of the stiffener 4.

According to this first variant, the interruption of a batten 15, or the point to which a batten 15 covers the end 16 of a stiffener 4, is closer to the reinforcing frame 5 on the sides 12 and 14 of a head 9 than on the sole plates 10 and 11. The wall 18 of a batten 15 then undergoes a significant reduction in its coverage surface on the sides of the head 9 of a stiffener closer to the reinforcing frames 5 than the interruption of the blade 17. This wall 18 therefore extends after this reduction in the form of a reduced wall 31 pressed on a low surface of a side of a stiffener 4 to the full interruption of the batten 15. The blade 17 and the reduced wall 31 are interrupted at the same level.

In a second variant, FIG. 4, the head 9 of the stiffener 4 is interrupted farther from the reinforcing frame 5 than the sole plates 10 and 11 of the stiffener 4. In this variant, the interruption of the head 9 of the stiffener 4 is formed along an inclined plane relative to the top 13. According to this variant of the disclosed embodiments, the batten 15, in addition to covering the sole plates 10 and 11 of a stiffener 4 and the sides 12 and 14 of a head 9 of a stiffener 4, cover a part 32 of the inclined plane in the interruption of the head 9 of the stiffener 4. Therefore, the stiffener 15 has a stop 33 that extends by covering the head 9 of the stiffener 4, according to the interruption plane of inclination of the head 9 of the stiffener 4 by resting on the head 9.

According to this variant of the disclosed embodiments, stress is discharged from the stiffener 4 in the batten 15 first by the top 13 of the head 9 of the stiffener 4, then by the sides 12 and 14 of the head 9, and finally by the sole plates 10 and 11 of the stiffener 4.

In this second variant, the interruption of a batten 15 on one end 16 of a section 6 of a stiffener 4 is closer to the reinforcing frame 5 on the sole plates 10 and 11 than on the sides 12 and 14 of a head 9. The wall 18 then extends farther from the reinforcing frame 5 than the blade 17.

In addition, the disclosed embodiments can provide for the batten 15 to have a means for maintaining the alignment of the two consecutive stiffener sections 5 interrupted by a reinforcing frame 5.

In the second variant, meaning the variant where the sole plates 10 and 11 of the stiffeners 4 are interrupted closer to the reinforcing frame 5 than the head 9 of the stiffener 4, the disclosed embodiments provide that an area 34 of the wall 18 has a lesser thickness at the end of the head 9. Such a weak area 34 allows the wall 18 to fold lightly in order to maintain an alignment of the various sections 6 of the stiffener 4. When installing the various sections 6 of a stiffener 4, it is often difficult to maintain a perfect alignment of the sections 6.

According to the disclosed embodiments, the advantage of such a batten 15 also comes from the way the batten 15 is built. Many manufacturing and installation methods can be used to produce a batten 15 according to the disclosed embodiments.

Therefore, a batten 15 made from composite materials and a skin 7 according to the disclosed embodiments can be made together and at the same time. Similarly, such a batten 15 made from composite materials and stiffeners 4 according to the disclosed embodiments can be made together and at the same time. Another solution consists of making the batten 15 separately from the stiffeners 4 and attaching it to the stiffener 4 and the skin 7 later. The battens 15 can, for example, be glued to a polymer skin 7 or even bolted to the stiffeners 4 and the skin 7.

According to the disclosed embodiments, the embodiments and batten variants described above can be combined. Therefore, a stiffener can, for example, be covered on one side by a batten 20 according to the first embodiment, while its other side is covered by a stiffener 28 according to the third embodiment. It is also possible to combine variants. For example, a stiffener can have a first sole plate 10 interrupted closer to the reinforcing frame 5 than the head 9, the head 9 itself being interrupted closer to the reinforcing frame 5 than the second sole plate 11.

The invention claimed is:

1. An aircraft comprising:
    a fuselage,
    a stiffener, having an omega-shaped transverse section, said stiffener extending on a fuselage plate covering an inner wall of the fuselage, along a longitudinal axis of said fuselage,
    a reinforcing frame arranged perpendicular to the longitudinal axis of the fuselage,
    the stiffener being separated into two sections, each section on an opposite side of an intersection of the fuselage plate with the reinforcing frame,
    a one piece batten covering ends and sides of the separated sections of the stiffener at the intersection of the fuselage plate with the reinforcing frame, and joining the two separated sections of the stiffener,
    wherein the batten is located between the fuselage plate and the reinforcing frame, said reinforcing frame resting against the batten.

2. An aircraft according to claim 1, wherein the batten forms a support surface for said reinforcing frame.

3. An aircraft according to claim 1, wherein the batten has at least one blade supported on a sole plate of the stiffener and at least one wall supported on a side of a head of said stiffener.

4. An aircraft according to claim 1, wherein the batten has at least two blades supported on two sole plates of the stiffener and at least two walls supported on two sides of the stiffener.

5. An aircraft according to claim 1, comprising another batten located at an end of the stiffener, opposite the intersection of the fuselage plate with the reinforcing frame.

6. An aircraft according to claim 1, wherein the batten has a stop that extends according to an interruption plane of inclination of a head of the stiffener by resting on the head.

7. An aircraft according to claim 6, wherein the batten has a lesser thickness, this lesser thickness being located on a wall of the batten at the interruption of the head of the stiffener.

8. An aircraft according to claim 1, wherein the fuselage plate and the at least one batten are made together and at the same time from a composite material.

9. An aircraft according to claim 1, wherein the stiffener and the at least one batten are made together and at the same time from a composite material.

10. An aircraft according to claim 1, wherein the at least one batten is made separate from the stiffener and is attached to the stiffener and the fuselage plate.

11. An aircraft according to claim 1, wherein the batten has at least two blades each supported on a sole plate of different stiffeners arranged side by side in parallel, and at least two walls each supported on a side of the different stiffeners.

* * * * *